(12) United States Patent
Opos et al.

(10) Patent No.: US 9,244,668 B1
(45) Date of Patent: Jan. 26, 2016

(54) SYSTEMS AND METHODS FOR SYNCHRONIZING MOBILE COMPUTING PLATFORMS

(71) Applicant: Symantec Corporation, Mountain View, CA (US)

(72) Inventors: Joshua Opos, Sherman Oaks, CA (US); Praveen Joginapally, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 116 days.

(21) Appl. No.: 13/764,186

(22) Filed: Feb. 11, 2013

(51) Int. Cl.
  *G06F 9/44* (2006.01)
  *G06F 9/445* (2006.01)

(52) U.S. Cl.
  CPC .... *G06F 8/60* (2013.01); *G06F 8/61* (2013.01)

(58) Field of Classification Search
  None
  See application file for complete search history.

(56) References Cited

U.S. PATENT DOCUMENTS

| | | | |
|---|---|---|---|
| 2007/0061242 A1* | 3/2007 | Ramer et al. | 705/37 |
| 2010/0262619 A1* | 10/2010 | Zargahi et al. | 707/770 |
| 2010/0262958 A1* | 10/2010 | Clinton et al. | 717/171 |
| 2011/0010699 A1* | 1/2011 | Cooper et al. | 717/169 |
| 2013/0024778 A1* | 1/2013 | Reeves et al. | 715/744 |
| 2013/0183951 A1* | 7/2013 | Chien | 455/418 |
| 2013/0205277 A1* | 8/2013 | Seven et al. | 717/121 |
| 2013/0324097 A1* | 12/2013 | Roberts et al. | 455/418 |
| 2014/0006434 A1* | 1/2014 | Chervirala et al. | 707/758 |
| 2014/0032275 A1* | 1/2014 | Kalb et al. | 705/7.35 |
| 2014/0040231 A1* | 2/2014 | Lin | 707/708 |
| 2014/0074601 A1* | 3/2014 | Delug | 705/14.53 |
| 2014/0162614 A1* | 6/2014 | Lindeman et al. | 455/414.1 |
| 2014/0201366 A1* | 7/2014 | Kamp | 709/225 |
| 2014/0250068 A1* | 9/2014 | Visalli et al. | 707/628 |

OTHER PUBLICATIONS

Charles Andrew Payne; Cross-Platform Conversion of Encoded Mobile App Store Links; U.S. Appl. No. 13/462,602, filed May 2, 2012.
"Google Sync", http://www.google.com/sync/index.html, as accessed Nov. 14, 2012, (Feb. 12, 2009).
"Easy Phone Sync", https://web.archive.org/web/20120919071728/http:/easyphonesync.com/, as accessed Nov. 14, 2012, (Jun. 25, 2012).

* cited by examiner

*Primary Examiner* — Isaac T Tecklu
(74) *Attorney, Agent, or Firm* — ALG Intellectual Property, LLC

(57) ABSTRACT

A computer-implemented method for synchronizing mobile computing platforms may include (1) identifying a set of applications installed on a mobile computing platform, (2) detecting a request from an additional mobile computing platform to synchronize the additional mobile computing platform and the mobile computing platform with respect to the set of applications, and then (3) synchronizing the additional mobile computing platform and the mobile computing platform with respect to the set of applications by (a) querying an application-matching engine to determine an equivalent set of applications that corresponds to the set of applications on the additional mobile computing platform and then (b) directing the additional mobile computing platform to download the equivalent set of applications. Various other methods, systems, and computer-readable media are also disclosed.

20 Claims, 8 Drawing Sheets

Equivalent-Application Information
216

---
****************************************

DESTINATION PLATFORM: Mobile Computing Platform 122

DESTINATION PLATFORM IDENTIFIER: GOOGLE ANDROID

EQUIVALENT SET OF APPLICATIONS TO BE INSTALLED ON DESTINATION PLATFORM:

| APPLICATION NAME | APPLICATION IDENTIFIER |
|---|---|
| Picture App | 21532 |
| Game App | 95781 |
| ⋮ | ⋮ |
| Social App | 74823 |

SYSTEMS AND METHODS FOR SYNCHRONIZING MOBILE COMPUTING PLATFORMS

BACKGROUND

In today's world of evolving computing technology, many technology users eventually switch from one mobile computing platform to another. For example, a technology user may upgrade to a new smartphone configured to download applications from a different virtual store than his or her previous smartphone. In this example, since the user's new smartphone is configured to download applications from a different virtual store, the user may need to manually locate the same applications installed on his or her previous smartphone in the other virtual store in order to bring the new smartphone up to date with the previous smartphone.

Similarly, many technology users eventually add a new mobile computing platform to their existing collection of platforms. For example, a technology user may purchase a new tablet computer configured to download applications from a different virtual store than his or her smartphone. In this example, since the user's new tablet computer is configured to download applications from a different virtual store, the user may need to manually locate the same applications installed on his or her smartphone in the other virtual store in order to synchronize the new tablet computer with the smartphone. Unfortunately, this process of manually locating the same applications in another virtual store may be tedious and time-consuming.

What is needed, therefore, are systems and methods for synchronizing mobile computing platforms such that users of the mobile computing platforms no longer need to manually locate the same applications in multiple virtual stores.

SUMMARY

As will be described in greater detail below, the instant disclosure generally relates to systems and methods for synchronizing mobile computing platforms such that users of the mobile computing platforms no longer need to manually locate the same applications in different virtual stores.

In one example, a computer-implemented method for synchronizing mobile computing platforms may include (1) identifying a set of applications installed on a mobile computing platform, (2) detecting a request from an additional mobile computing platform to synchronize the additional mobile computing platform and the mobile computing platform with respect to the set of applications, and then (3) synchronizing the additional mobile computing platform and the mobile computing platform with respect to the set of applications by (a) querying an application-matching engine to determine an equivalent set of applications that corresponds to the set of applications on the additional mobile computing platform and then (b) directing the additional mobile computing platform to download the equivalent set of applications.

In some examples, the method may also include collecting application information that identifies the set of applications installed on the mobile computing platform. In such examples, the method may further include storing the application information in a cloud-based synchronization account capable of being accessed by the additional mobile computing platform.

In some examples, the method may also include providing the mobile computing platform with a synchronization application that, when executed by the mobile computing platform, directs the mobile computing platform to locate the application information on the mobile computing platform and then upload the application information to the cloud-based synchronization account. In other examples, the method may further include providing the mobile computing platform with a synchronization library that, when called by an application running on the mobile computing platform, directs the application to locate the application information on the mobile computing platform and then upload the application information to the cloud-based synchronization account.

In some examples, the method may also include identifying a client device that interfaces with the mobile computing platform. In such examples, the method may further include identifying a client-based application installed on the client device that facilitates access to the application information that identifies the set of applications installed on the mobile computing platform. In addition, the method may include providing the client device with a synchronization application that, when executed by the client device, directs the client device to collect the application information that identifies the set of applications installed on the mobile computing platform via the client-based application and then upload the application information to the cloud-based synchronization account.

In some examples, the method may also include obtaining the request to synchronize the additional mobile computing platform and the mobile computing platform from the additional mobile computing platform. In such examples, the method may further include locating a platform identifier that identifies the additional mobile computing platform in the request obtained from the additional mobile computing platform. In addition, the method may include querying the application-matching engine based at least in part on the application information that identifies the set of applications installed on the mobile computing platform and the platform identifier that identifies the additional mobile computing platform and then determining the equivalent set of applications based at least in part on querying the application-matching engine.

In some examples, the method may also include entering the application information and the platform identifier into the application-matching engine. In such examples, the method may further include obtaining equivalent-application information that identifies the equivalent set of applications from the application-matching engine. In addition, the method may include storing the equivalent-application information in the cloud-based synchronization account.

In some examples, the method may also include providing the additional mobile computing platform with a synchronization application that, when executed by the additional mobile computing platform, directs the additional mobile computing platform to issue the request. In such examples, the method may further include obtaining the request from the additional mobile computing platform via the synchronization application.

In some examples, the method may also include authenticating the additional mobile computing platform with a cloud-based synchronization account prior to satisfying the request. In such examples, the method may further include obtaining user credentials from the additional mobile computing platform via the synchronization application. In addition, the method may include searching an authentication database associated with the cloud-based synchronization account for the user credentials obtained from the additional mobile computing platform and then identifying the user credentials obtained from the additional mobile computing platform while searching the authentication database associated with the cloud-based synchronization account.

In some examples, the method may also include providing the mobile computing platform with a synchronization library that, when called by an application running on the additional mobile computing platform, directs the additional mobile computing platform to issue the request. In such examples, the method may further include obtaining the request from the additional mobile computing platform via the application running on the additional mobile computing platform.

In some examples, the method may also include identifying a virtual store that hosts downloadable applications corresponding to the additional mobile computing platform. In such examples, the method may further include identifying the equivalent set of applications within the downloadable applications hosted by the virtual store. In addition, the method may include directing the additional mobile computing platform to download the equivalent set of applications from the virtual store upon identifying the equivalent set of applications within the downloadable applications hosted by the virtual store.

In some examples, the method may also include directing the additional mobile computing platform to automatically download the equivalent set of applications from the virtual store without requiring user input to initiate a download of each application in the equivalent set of applications. In such examples, the method may further include directing the additional mobile computing platform to automatically install the equivalent set of applications without requiring user input to initiate an install of each application in the equivalent set of applications.

In other examples, the method may also include directing the additional mobile computing platform to navigate to each application in the equivalent set of applications within the virtual store in order to enable the additional mobile computing platform to download each application in the equivalent set of applications in response to user input.

In some examples, the mobile computing platform may include an operating system running on a mobile hardware architecture. In such examples, the additional mobile computing platform may include a different operating system running on a different mobile hardware architecture.

In one embodiment, a system for implementing the above-described method may include (1) an identification module programmed to identify a set of applications installed on a mobile computing platform, (2) a detection module programmed to detect a request from an additional mobile computing platform to synchronize the additional mobile computing platform and the mobile computing platform with respect to the set of applications, and (3) a synchronization module programmed to synchronize the additional mobile computing platform and the mobile computing platform with respect to the set of applications by (a) querying an application-matching engine to determine an equivalent set of applications that corresponds to the set of applications on the additional mobile computing platform and then (b) directing the additional mobile computing platform to download the equivalent set of applications. In this embodiment, the system may also include at least one processor configured to execute the identification module, the detection module, and the synchronization module.

In some examples, the above-described method may be encoded as computer-readable instructions on a non-transitory computer-readable-storage medium. For example, a non-transitory computer-readable-storage medium may include one or more computer-executable instructions that, when executed by at least one processor of a computing device, may cause the computing device to (1) identify a set of applications installed on a mobile computing platform, (2) detect a request from an additional mobile computing platform to synchronize the additional mobile computing platform and the mobile computing platform with respect to the set of applications, and then (3) synchronize the additional mobile computing platform and the mobile computing platform with respect to the set of applications by (a) querying an application-matching engine to determine an equivalent set of applications that corresponds to the set of applications on the additional mobile computing platform and then (b) directing the additional mobile computing platform to download the equivalent set of applications.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is an illustration of exemplary equivalent-application information used to facilitate synchronizing mobile computing platforms.

Figure 1:
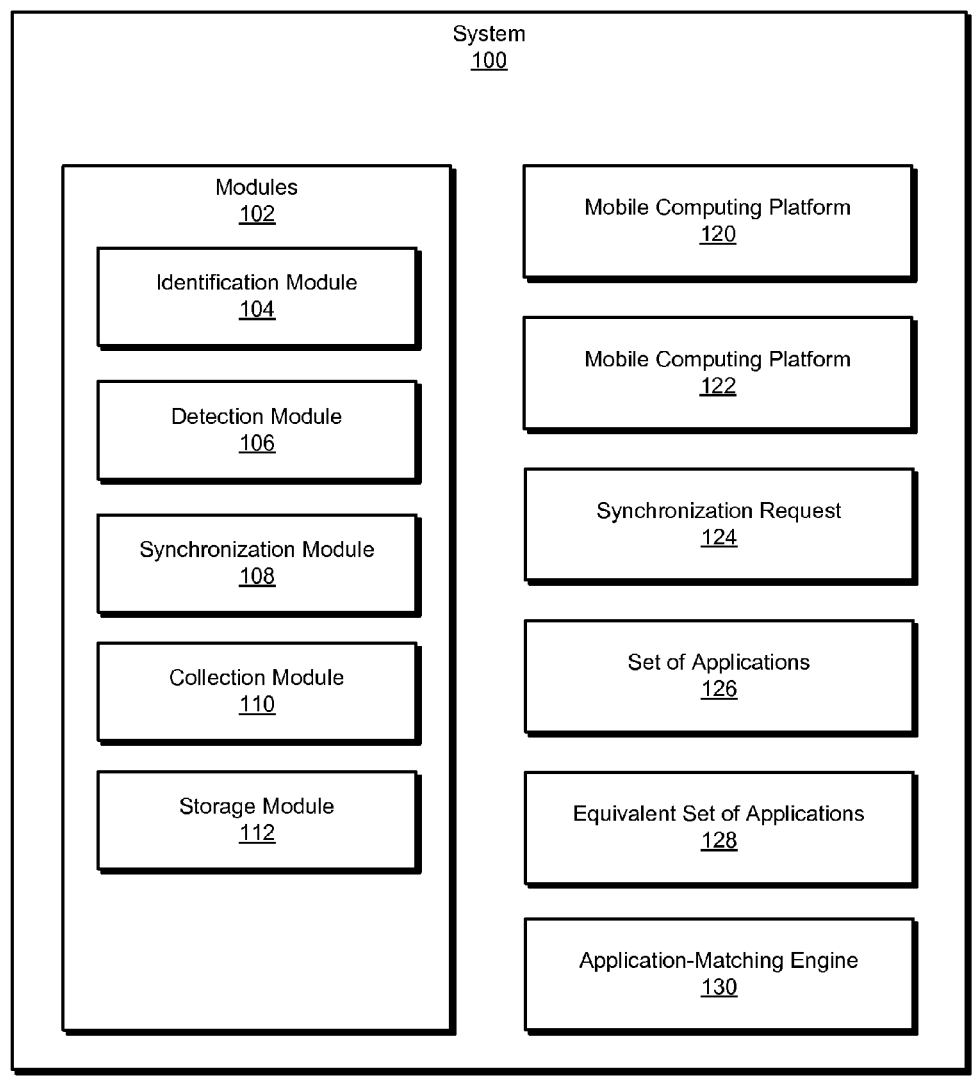
FIG. 1 is a block diagram of an exemplary system for synchronizing mobile computing platforms.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for synchronizing mobile computing platforms. As will be explained in greater detail below, by facilitating at least partially automated synchronization of mobile computing platforms, the systems and methods described herein may eliminate the need to have users of the mobile computing platforms manually locate the same applications in different virtual stores. In addition, by eliminating the need to have users manually locate the same applications in different virtual stores, the systems and methods described herein may help improve the users' experience with switching from one mobile computing platform to another and/or adding a new mobile computing platform to their existing collection of platforms.

Figure 2:
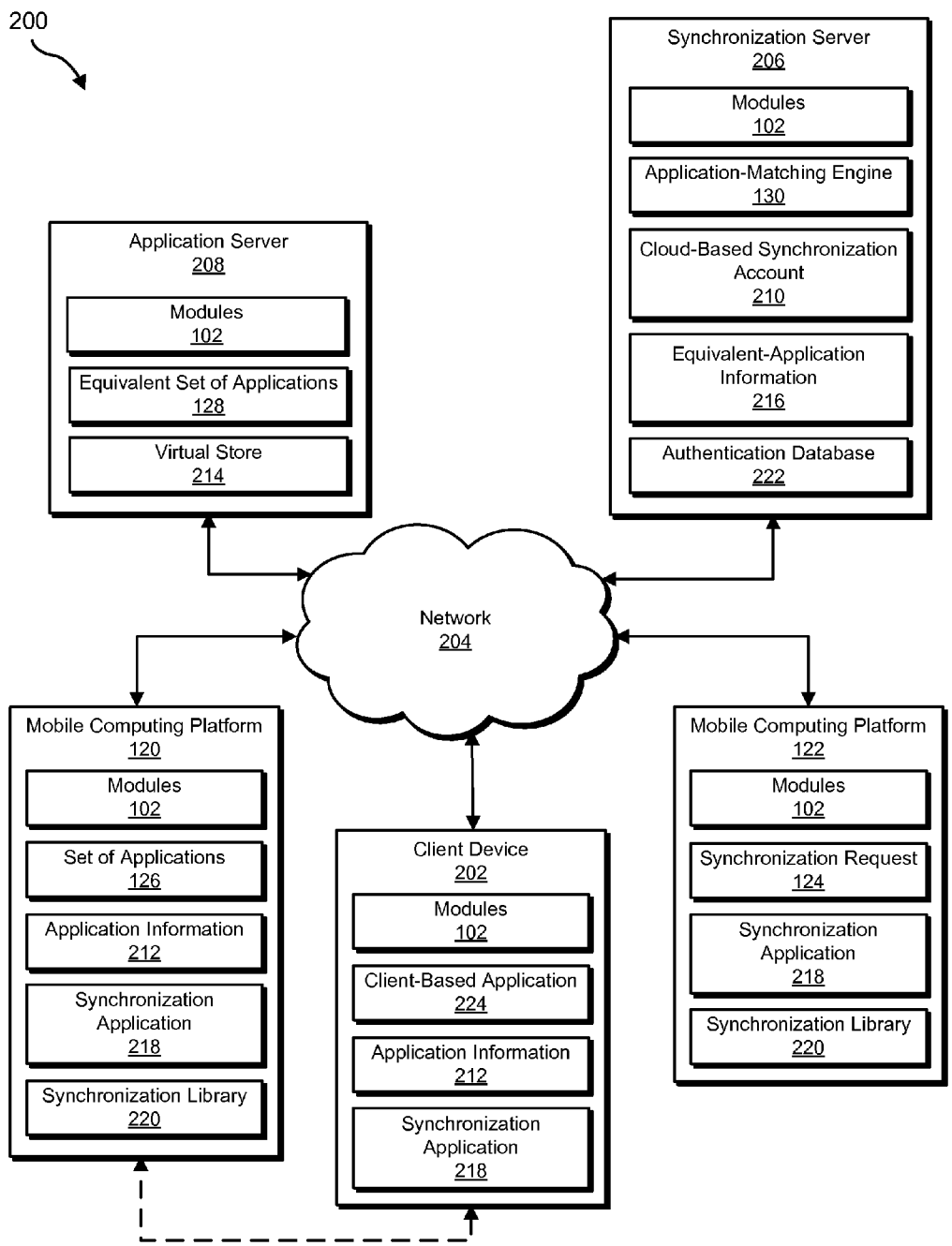
FIG. 2 is a block diagram of an exemplary system for synchronizing mobile computing platforms.

The following will provide, with reference to FIGS. 1-2, detailed descriptions of exemplary systems for synchronizing mobile computing platforms. Detailed descriptions of corresponding computer-implemented methods will be provided in connection with FIG. 3. Detailed descriptions of exemplary application information will be provided in connection with FIG. 4. Detailed descriptions of an exemplary synchronization request and exemplary equivalent-application information will be provided in connection with FIGS. 5 and 6, respectively. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for synchronizing mobile computing platforms. As illustrated in this figure, exemplary system 100 may include one or more modules 102 for performing one or more tasks. For example, and as will be explained in greater detail below, exemplary system 100 may include an identification module 104 programmed to identify a set of applications installed on a mobile computing platform. Exemplary system 100 may also include a detection module 106 programmed to detect a request from an additional mobile computing platform to synchronize the additional mobile computing platform and the mobile computing platform with respect to the set of applications.

In addition, and as will be described in greater detail below, exemplary system 100 may include a synchronization module 108 programmed to synchronize the additional mobile computing platform and the mobile computing platform with respect to the set of applications by (1) querying an application-matching engine to determine an equivalent set of applications that corresponds to the set of applications on the additional mobile computing platform and then (2) directing the additional mobile computing platform to download the equivalent set of applications.

In some embodiments, exemplary system 100 may also include a collection module 110 programmed to collect application information that identifies the set of applications installed on the mobile computing platform. Exemplary system 100 may further include a storage module 112 programmed to store the application information in a cloud-based synchronization account capable of being accessed by the additional mobile computing platform. Although illustrated as separate elements, one or more of modules 102 in FIG. 1 may represent portions of a single module or application (such as SYMANTEC'S NORTON ACCOUNT).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 1 (e.g., mobile computing platform 120 and/or mobile computing platform 122), the devices illustrated in FIG. 2 (e.g., mobile computing platform 120, mobile computing platform 122, client device 202, synchronization server 206, and/or application server 208), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more mobile computing platforms, such as mobile computing platform 120 and/or mobile computing platform 122. The phrase "mobile computing platform," as used herein, generally refers to any particular combination of hardware architecture and software framework.

Mobile computing platforms 120 and 122 generally represent any type or form of mobile computing device that includes a hardware architecture capable of reading computer-executable instructions and a software framework that enables the hardware architecture to execute applications. Examples of mobile computing platforms 120 and 122 include, without limitation, GOOGLE ANDROID-based mobile devices, APPLE IOS-based mobile devices, SAMSUNG BADA-based mobile devices, BLACKBERRY OS-based mobile devices, NOKIA SERIES 40-based mobile devices, SYMBIAN OS-based mobile devices, MICROSOFT WINDOWS PHONE-based mobile devices, and/or any other suitable mobile computing platforms. Examples of such mobile devices include, without limitation, laptops, tablets, cellular phones, smartphones, Personal Digital Assistants (PDAs), multimedia players, embedded systems, combinations of one or more of the same, exemplary computing system 710 in FIG. 7, and/or any other suitable mobile devices.

In some examples, mobile computing platforms 120 and 122 may represent different mobile computing platforms that correspond to different virtual stores. For example, mobile computing platform 120 may represent an APPLE IOS-based smartphone configured to download applications from the APPLE APP STORE. In this example, mobile computing platform 122 may represent a GOOGLE ANDROID-based smartphone configured to download applications from GOOGLE PLAY and/or the AMAZON APPSTORE.

As illustrated in FIG. 1, exemplary system 100 may also include one or more synchronization requests, such as synchronization request 124. In one example, synchronization request 124 may be configured to initiate the process of synchronizing mobile computing platform 122 and mobile computing platform 120 with respect to a particular set of applications (e.g., set of applications 126). In this example, synchronization request 124 may include a platform identifier that identifies the particular type of mobile computing platform requesting synchronization.

As illustrated in FIG. 1, exemplary system 100 may also include one or more sets of applications, such as set of applications 126. In one example, set of applications 126 may include one or more applications that have been downloaded and installed on a source mobile computing platform (e.g., mobile computing platform 120). Examples of such applications (also commonly referred to as "apps") include, without limitation, gaming applications (such ANGRY BIRDS), music applications (such as SPOTIFY), utility applications (such as CAMERA+), social-networking applications (such as FACEBOOK), business applications (such as QUICKBOOKS), entertainment applications (such as NETFLIX), news applications (such as the NEW YORK TIMES app), sports applications (such as GOLFSHOT), weather applications (such as the WEATHER CHANNEL app), search tool applications (such as the GOOGLE SEARCH app), productivity applications (such as MAILSHOT), combinations of one or more of the same, and/or any other suitable applications.

In one example, set of applications 126 may include each application downloaded by the source mobile computing platform from at least one virtual store that corresponds to the source mobile computing platform. In another example, set of applications 126 may include a subset of applications downloaded by the source mobile computing platform from the virtual store that corresponds to the source mobile computing platform.

As illustrated in FIG. 1, exemplary system 100 may also include one or more equivalent sets of applications, such as equivalent set of applications 128. The phrase "equivalent set of applications," as used herein, generally refers to any set of applications that collectively equate to a set of applications installed on a source mobile computing platform (e.g., mobile computing platform 120) but correspond to a destination mobile computing platform (e.g., mobile computing platform 122).

In some examples, set of applications 126 and equivalent set of applications 128 may be essentially identical except that set of applications 126 are configured to run on mobile computing platform 120 while equivalent set of applications 128 are configured to run on mobile computing platform 122. In other examples, set of applications 126 and equivalent set of applications 128 may collectively represent and/or provide one or more of the same features even though set of applications 126 and equivalent set of applications 128 differ in one way or another (e.g., set of applications 126 and equivalent set of applications 128 include applications that have different names, set of applications 126 and equivalent set of applications 128 include applications produced and/or released by different software companies, and/or set of applications 126 includes a different number of applications than equivalent set of applications 128).

As illustrated in FIG. 1, exemplary system 100 may also include one or more application-matching engines, such as application-matching engine 130. The phrase "application-matching engine," as used herein, generally refers to any type or form of computing mechanism used to determine and/or identify an equivalent set of applications that collectively equate to a set of applications installed on a source mobile computing platform (e.g., mobile computing platform 120) but correspond to a destination mobile computing platform (e.g., mobile computing platform 122). Examples of application-matching engine 130 include, without limitation, lookup tables, databases (such as relational databases, hierarchical databases, flat file databases), knowledge bases, directories, indexes, executable modules, combinations of one or more of the same, and/or any other suitable application-matching engines.

Exemplary system 100 in FIG. 1 may be implemented in a variety of ways. For example, all or a portion of exemplary system 100 may represent portions of exemplary system 200 in FIG. 2. As shown in FIG. 2, system 200 may include mobile computing platforms 120 and 122 in communication with a synchronization server 206 via a network 204. Mobile computing platform 120 and/or mobile computing platform 122 may be programmed with one or more of modules 102. Additionally or alternatively, synchronization server 206 may be programmed with one or more of modules 102.

As shown in FIG. 2, mobile computing platform 120 may include one or more of modules 102, set of applications 126, application information 212, synchronization application 218, and a synchronization library 220. In one example, application information 212 may identify set of applications 126 installed on mobile computing platform 120.

In one example, synchronization application 218 may enable mobile computing platform 120 to locate application information 212 and then upload application information 212 to a cloud-based synchronization account (e.g., cloud-based synchronization account 210 in FIG. 2). In this example, synchronization application 218 may include and/or use one or more of modules 102.

Synchronization library 220 generally represents any type or form of auxiliary computer-executable code or modules that supplement one or more existing features of an application running on a mobile computing platform. In one example, synchronization library 220 may enable an application running on mobile computing platform 120 to locate application information 212 on mobile computing platform 120 and then upload application information 212 to the cloud-based synchronization account. In this example, synchronization library 220 may also include and/or use one or more of modules 102.

As shown in FIG. 2, synchronization server 206 may include one or more of modules 102, application-matching engine 130, a cloud-based synchronization account 210, equivalent-application information 216, and an authentication database 222. The phrase "cloud-based synchronization account," as used herein, generally refers to any type or form of cloud-based account or profile configured to store information used to synchronize mobile computing platforms.

In one example, cloud-based synchronization account 210 may store application information 212 that identifies set of applications 126 installed on mobile computing platform 120. Additionally or alternatively, cloud-based synchronization account 210 may store equivalent-application information 216 that identifies equivalent set of applications 128 that collectively equate to set of applications 126 but correspond to mobile computing platform 122.

In one example, cloud-based synchronization account 210 may belong to a user who is upgrading to mobile computing platform 122 from mobile computing platform 120. In another example, cloud-based synchronization account 210 may belong to a user who is adding mobile computing platform 122 to his or her collection of platforms (which includes mobile computing platform 120).

In one example, authentication database 222 may be configured to store any type or form of authentication information used to authenticate mobile computing platform 122 with cloud-based synchronization account 210. For example, authentication database 222 may store user credentials (e.g., username and password) associated with cloud-based synchronization account 210.

As shown in FIG. 2, mobile computing platform 122 may include one or more of modules 102, synchronization request 124, synchronization application 218, and synchronization library 220. In one example, synchronization application 218 may enable mobile computing platform 122 to issue synchronization request 124 and then access equivalent-application information 216 stored in cloud-based synchronization account 210. In this example, synchronization application 218 may include and/or use one or more of modules 102.

As shown in FIG. 2, system 200 may also include an application server 208 that provides a virtual store 214 corresponding to mobile computing platform 122 via network 204. Virtual store 214 may host equivalent set of applications 128 such that mobile computing platform 122 is able to download equivalent set of applications 128 from application server 208 via network 204. The phrase "virtual store," as used herein, generally refers to any type or form of software distribution mechanism that hosts and/or distributes one or more applications configured to run on a destination mobile computing platform (e.g., mobile computing platform 122). Examples of virtual store 214 include, without limitation, GOOGLE PLAY, the APPLE APP STORE, the WINDOWS STORE, the AMAZON APPSTORE, GETJAR, and/or any other suitable virtual stores.

As shown in FIG. 2, system 200 may also include a client device 202 that interfaces with mobile computing platform 120. Client device 202 may include a client-based application 224 that facilitates access to application information 212 that identifies set of applications 126 installed on mobile computing platform 120. Examples of client-based application 224 include, without limitation, APPLE ITUNES, GOOGLE SYNC MANAGER, GOOGLE PLAY, MICROSOFT ZUNE, and/or any other suitable client devices.

Additionally or alternatively, client device 202 may include synchronization application 218. In one example, synchronization application 218 may enable client device 202 to collect application information 212 via client-based application 224 and then upload application information 212 to cloud-based synchronization account 210. In this example, synchronization application 218 may include and/or use one or more of modules 102.

In one embodiment, one or more of modules 102 from FIG. 1 may, when executed by at least one processor of mobile computing platform 120, mobile computing platform 122, client device 202, and/or synchronization server 206, facilitate mobile computing platform 120, mobile computing platform 122, client device 202, and/or synchronization server 206 in synchronizing mobile computing platforms. For example, and as will be described in greater detail below, one or more of modules 102 may cause one or more of mobile computing platform 120, mobile computing platform 122, client device 202, and/or synchronization server 206 to (1) identify set of applications 126 installed on mobile computing platform 120, (2) detect synchronization request 124 from mobile computing platform 122 to synchronize mobile computing platform 122 and mobile computing platform 120 with respect to set of applications 126, and then (3) synchronize mobile computing platform 122 and mobile computing platform 120 with respect to set of applications 126 by (a) querying application-matching engine 130 to determine equivalent set of applications 128 that corresponds to set of applications 126 on mobile computing platform 122 and then (b) directing mobile computing platform 122 to download equivalent set of applications 128.

Client device 202 generally represents any type or form of computing device capable of reading computer-executable instructions. Examples of client device 202 include, without limitation, laptops, tablets, desktops, servers, cellular phones, Personal Digital Assistants (PDAs), multimedia players, embedded systems, combinations of one or more of the same, exemplary computing system 710 in FIG. 7, and/or any other suitable client devices.

Synchronization server 206 generally represents any type or form of one or more computing devices and/or storage devices capable of facilitating at least partially automated synchronization of mobile computing platforms. Examples of synchronization server 206 include, without limitation, application servers, web servers, storage servers, and/or database servers configured to run certain software applications and/or provide various web, storage, and/or database services.

Application server 208 generally represents any type or form of one or more computing devices and/or storage devices capable of hosting and/or distributing applications configured to run on one or more mobile computing platforms. Examples of application server 208 include, without limitation, application servers, web servers, storage servers, and/or database servers configured to run certain software applications and/or provide various web, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between the devices illustrated in FIG. 2.

Figure 3:
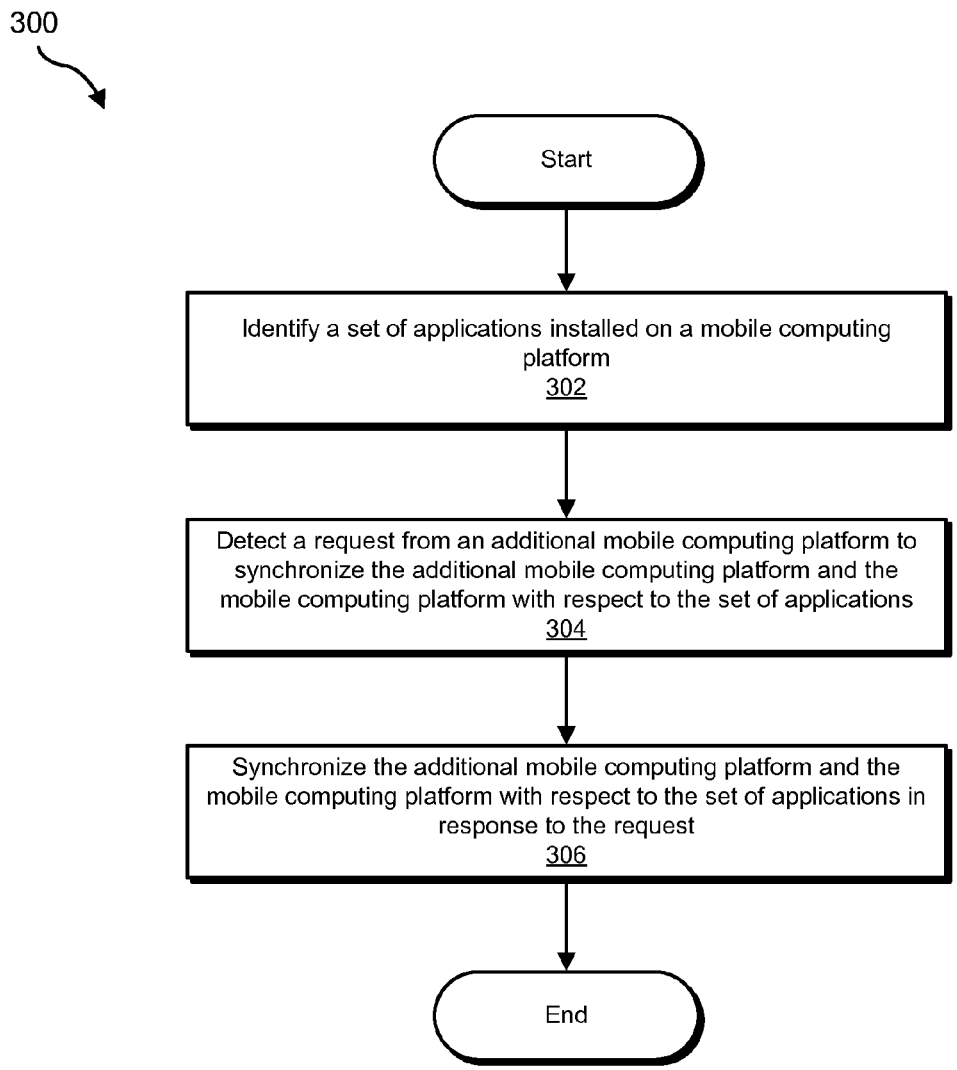
FIG. 3 is a flow diagram of an exemplary method for synchronizing mobile computing platforms.

FIG. 3 is a flow diagram of an exemplary computer-implemented method 300 for synchronizing mobile computing platforms. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify a set of applications installed on a mobile computing platform. For example, at step 302 identification module 104 may, as part of synchronization server 206 in FIG. 2, identify set of applications 126 installed on mobile computing platform 120. In this example, set of applications 126 may have been previously downloaded by mobile computing platform 120 from a virtual store (not illustrated in FIG. 2) that corresponds to mobile computing platform 120.

The systems described herein may perform step 302 in a variety of ways. In one example, a user may direct mobile computing platform 120 to initiate downloading synchronization application 218 provided by synchronization server 206. In this example, mobile computing platform 120 may download synchronization application 218 from synchronization server 206 via network 204 and then install synchronization application 218 to facilitate collecting application information 212 that identifies set of applications 126.

In one example, collection module 110 may, as part of synchronization application 218 installed on mobile computing platform 120, collect application information 212 that identifies set of applications 126 installed on mobile computing platform 120. For example, collection module 110 may, when executed by mobile computing platform 120, locate a directory that includes at least one file associated with each application included in set of applications 126 within a file system of mobile computing platform 120. In this example, collection module 110 may scan the directory located within the file system of mobile computing platform 120 for information that identifies each application included in set of applications 126. Collection module 110 may then compile application information 212 while scanning the directory located within the file system of mobile computing platform 120.

Figure 4:
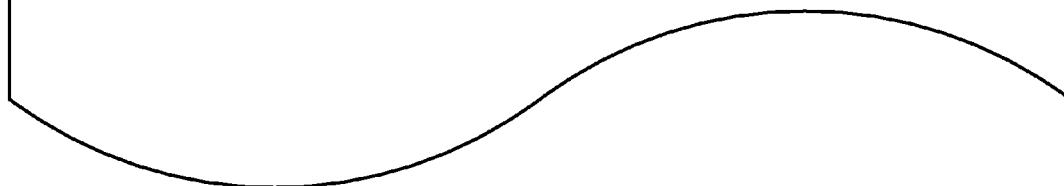
FIG. 4 is an illustration of exemplary application information used to facilitate synchronizing mobile computing platforms.

As illustrated in FIG. 4, application information 212 may identify a source platform on which the set of applications are installed (in this example, "Mobile Computing Platform 120"), a source platform identifier that identifies the platform type of the source platform (in this example, "APPLE IOS"), the name of each application included in the set of applications installed on the source platform (in this example, "Photo App," "Game App," and "Social App"), and an application identifier that uniquely identifies each application included in the set of applications installed on the source platform (in this example, "21532," "95781," and "61937").

In one example, the user may direct mobile computing platform 120 to initiate downloading synchronization library 220 provided by synchronization server 206. In this example, mobile computing platform 120 may download synchronization library 220 from synchronization server 206 via network 204 to enable at least one application installed on mobile computing platform 120 to collect application information 212 that identifies set of applications 126 by calling synchronization library 220.

In one example, collection module 110 may, as part of synchronization library 220, collect application information 212 that identifies set of applications 126 installed on mobile computing platform 120. For example, an application (such as SYMANTEC's NORTON MOBILE SECURITY) running on mobile computing platform 120 may call synchronization library 220 to locate a directory that includes at least one file associated with each application included in set of applications 126 within a file system of mobile computing platform 120. In this example, collection module 110 may scan the directory located within the file system of mobile computing platform 120 for information that identifies each application included in set of applications 126. Collection module 110 may then compile application information 212 while scanning the directory located within the file system of mobile computing platform 120.

In one example, mobile computing platform 120 may facilitate uploading application information 212 to cloud-based synchronization account 210 by sending application information 212 to synchronization server 206 via network 204. In this example, synchronization server 206 may obtain application information 212 from mobile computing platform 120 via network 204. Identification module 104 may then identify application information 212 as synchronization server 206 obtains application information 212 from mobile computing platform 120. After synchronization server 206 has obtained application information 212, storage module 112 may, as part of synchronization server 206, store application information 212 in cloud-based synchronization account 210.

In one example, the user may physically or wirelessly connect mobile computing platform 120 with client device 202 to manage the contents and/or configuration of mobile computing platform 120 from client device 202. Upon physically or wirelessly connecting mobile computing platform 120 with client device 202, the user may use client-based application 224 installed on client device 202 to synchronize mobile computing platform 120 and client device 202 with respect to at least one set of features (e.g., a set of files, music, applications, photographs, videos, configuration settings, preferences, events, calendar items, and/or voice memos). Client-based application 224 may have access to a directory that includes at least one file associated with each application included in set of applications 126 within a file system of client device 202.

In one example, the user may direct client device 202 to initiate downloading synchronization application 218 provided by synchronization server 206. In this example, client device 202 may download synchronization application 218 from synchronization server 206 via network 204 and then install synchronization application 218 to facilitate collecting application information 212 that identifies set of applications 126.

In one example, collection module 110 may, as part of synchronization application 218 installed on client device 202, collect application information 212 that identifies set of applications 126 installed on mobile computing platform 120. For example, collection module 110 may use client-based application 224 to locate the directory that includes at least one file associated with each application included in set of applications 126 within the file system of client device 202. In this example, collection module 110 may scan the directory located within the file system of client device 202 for information that identifies each application included in set of applications 126 installed on mobile computing platform 120. Collection module 110 may then compile application information 212 while scanning the directory located within the file system of client device 202.

In one example, client device 202 may facilitate uploading application information 212 to cloud-based synchronization account 210 by sending application information 212 to synchronization server 206 via network 204. In this example, synchronization server 206 may obtain application information 212 from client device 202 via network 204. Identification module 104 may then identify application information 212 as synchronization server 206 obtains application information 212 from client device 202. After synchronization server 206 has obtained application information 212, storage module 112 may, as part of synchronization server 206, store application information 212 in cloud-based synchronization account 210.

As will be described in greater detail below, by collecting, identifying, and storing application information 212 in cloud-based synchronization account 210, modules 102 may facilitate synchronizing mobile computing platforms 120 and 122 with respect to set of applications 126.

As illustrated in FIG. 3, at step 304 one or more of the systems described herein may detect a request from an additional mobile computing platform to synchronize the additional mobile computing platform and the mobile computing platform with respect to the set of applications. For example, at step 304 detection module 106 may, as part of synchronization server 206 in FIG. 2, detect synchronization request 124 from mobile computing platform 122. In this example, synchronization request 124 may be configured to initiate the process of synchronizing mobile computing platform 122 and mobile computing platform 120 with respect to set of applications 126.

The systems described herein may perform step 304 in a variety of ways. In one example, the user may direct mobile computing platform 122 to initiate downloading synchronization application 218 provided by synchronization server 206. In this example, mobile computing platform 122 may download synchronization application 218 from synchronization server 206 via network 204 and then install synchronization application 218 to facilitate synchronizing mobile computing platform 122 and mobile computing platform 120 with respect to set of applications 126.

Figure 5:
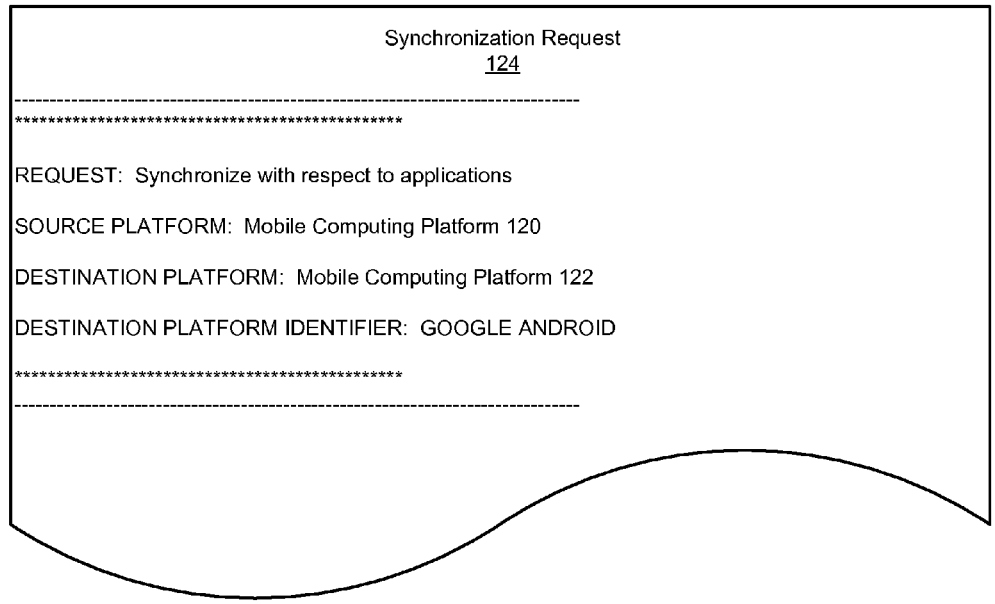
FIG. 5 is an illustration of an exemplary synchronization request.

In one example, the user may direct mobile computing platform 122 to issue synchronization request 124 via synchronization application 218. As illustrated in FIG. 5, synchronization request 124 may identify a request (in this example, "Synchronize with respect to applications"), a source platform on which the applications are installed (in this example, "Mobile Computing Platform 120"), a destination platform to be synchronized with the source platform (in this example, "Mobile Computing Platform 122"), and a destination platform identifier that identifies the platform type of the destination platform (in this example, "GOOGLE ANDROID"). Upon issuing synchronization request 124 via synchronization application 218, mobile computing platform 122 may send synchronization request 124 to synchronization server 206 via network 204 to initiate the process of synchronizing mobile computing platform 122 and mobile computing platform 120 with respect to set of applications 126.

In one example, the user may direct mobile computing platform 122 to initiate downloading synchronization library 220 provided by synchronization server 206. In this example, mobile computing platform 122 may download synchronization library 220 from synchronization server 206 via network 204 and then install synchronization application 218 to enable at least one application installed on mobile computing platform 122 to initiate synchronizing mobile computing platform 122 and mobile computing platform 120 by calling synchronization library 220.

In one example, the user may direct mobile computing platform 122 to issue synchronization request 124 via the application installed on mobile computing platform 122. For example, the user may direct mobile computing platform 122 to issue synchronization request 124 via an application (such as SYMANTEC's NORTON MOBILE SECURITY) running on mobile computing platform 122 by calling synchronization library 220. In this example, upon issuing synchronization request 124 via the application that calls synchronization library 220, mobile computing platform 122 may send synchronization request 124 to synchronization server 206 via network 204 to initiate the process of synchronizing mobile computing platform 122 and mobile computing platform 120 with respect to set of applications 126.

In one example, synchronization server 206 may obtain synchronization request 124 from mobile computing platform 122 via network 204. Detection module 106 may detect and/or identify synchronization request 124 as synchronization server 206 obtains synchronization request 124 from mobile computing platform 122 via network 204. Detection module 106 may then locate the platform identifier that identifies the platform type of mobile computing platform 122 in synchronization request 124.

As illustrated in FIG. 3, at step 306 one or more of the systems described herein may synchronize the additional mobile computing platform and the mobile computing platform with respect to the set of applications in response to detecting the request from the additional mobile computing platform. For example, at step 306 synchronization module 108 may, as part of synchronization server 206 in FIG. 2, synchronize mobile computing platform 122 and mobile computing platform 120 with respect to set of applications 126. In this example, synchronization module 108 may initiate the process of synchronizing mobile computing platform 122 and mobile computing platform 120 in response to synchronization request 124.

The systems described herein may perform step 306 in a variety of ways. In one example, synchronization module 108 may query application-matching engine 130 to determine equivalent set of applications 128 that correspond to set of applications 126 on mobile computing platform 122. For example, synchronization module 108 may query application-matching engine 130 based at least in part on application information 212 that identifies set of applications 126 installed on mobile computing platform 120 and the platform identifier that identifies the platform type of mobile computing platform 122. Synchronization module 108 may then determine equivalent set of applications 128 based at least in part on this query of application-matching engine 130.

In a more specific example, synchronization module 108 may enter at least a portion of application information 212 and the platform identifier that identifies the platform type of mobile computing platform 122 as input parameters into application-matching engine 130. In this example, application-matching engine 130 may use application information 212 and the platform identifier entered as input parameters to look up and output equivalent-application information 216 that identifies equivalent set of applications 128. Synchronization module 108 may obtain equivalent-application information 216 outputted by application-matching engine 130 and then store equivalent-application information 216 in cloud-based synchronization account 210.

As illustrated in FIG. 6, equivalent-application information 216 may identify a destination platform to be synchronized with a source platform (in this example, "Mobile Computing Platform 122"), a destination platform identifier that identifies the platform type of the destination platform (in this example, "GOOGLE ANDROID"), the name of each application included in the equivalent set of applications that correspond to the destination platform (in this example, "Picture App," "Game App," and "Social App"), and an application identifier that uniquely identifies each application included in the set of applications installed on the source platform (in this example, "21532," "95781," and "74823").

Application-matching engine 130 may be maintained and/or updated to account for newly identified relationships or correlations between new or existing applications. In one example, an administrator associated with synchronization server 206 may identify at least one relationship or correlation between at least one application configured to run on mobile computing platform 120 and at least one application configured to run on mobile computing platform 122. In this example, upon identifying this relationship or correlation, the administrator may populate application-matching engine 130 (or a database accessible to application-matching engine 130) to account for this relationship or correlation.

In another example, synchronization server 206 may include a bot configured to automatically identify at least one relationship or correlation between at least one application configured to run on mobile computing platform 120 and at least one application configured to run on mobile computing platform 122. In this example, upon identifying this relationship or correlation, the bot may automatically populate application-matching engine 130 (or a database accessible to application-matching engine 130) to account for this relationship or correlation. By accounting for newly identified relationships or correlations between new or existing applications, this process of maintaining and/or updating may ensure that application-matching engine 130 is able to provide and/or output equivalent-application information that accurately identifies the relationships or correlations between various applications across mobile computing platforms 120 and 122.

In one example, synchronization module 108 may ensure that the user of mobile computing platform 122 has the right to access cloud-based synchronization account 210 prior to satisfying synchronization request 124. For example, the user may enter his or her user credentials associated with cloud-based synchronization account 210 into synchronization application 218 installed on mobile computing platform 122. In this example, the user may direct mobile computing platform 122 to send the user credentials entered into synchronization application 218 to synchronization server 206 via network 204. Synchronization server 206 may then obtain the user credentials from mobile computing platform 122 via network 204.

In one example, synchronization module 108 may identify the user credentials as synchronization server 206 obtains the user credentials from mobile computing platform 122. In this example, synchronization module 108 may search authentication database 222 located on synchronization server 206 for the same user credentials (e.g., an identical set of user credentials) as obtained from mobile computing platform 122. Synchronization module 108 may then identify the same user credentials as obtained from mobile computing platform 122 while searching authentication database 222 located on synchronization server 206.

In one example, synchronization module 108 may satisfy synchronization request 124 by directing mobile computing platform 122 to download equivalent set of applications 128. For example, synchronization module 108 may direct synchronization server 206 to send equivalent-application information 216 to mobile computing platform 122 via network 204. In this example, mobile computing platform 122 may obtain equivalent-application information 216 from synchronization server 206 via network 204. Upon obtaining equivalent-application information 216 from synchronization server 206, mobile computing platform 122 may analyze equivalent-application information 216 to identify equivalent set of applications 128 based at least in part on equivalent-application information 216.

In one example, mobile computing platform 122 may identify virtual store 214 that hosts downloadable applications corresponding to mobile computing platform 122. In this example, mobile computing platform 122 may automatically identify equivalent set of applications 128 within the downloadable applications hosted by virtual store 214 in response to equivalent-application information 216. For example, mobile computing platform 122 may automatically identify the "Picture App," the "Game App," and the "Social App" illustrated in FIG. 6 within virtual store 214 in response to equivalent-application information 216. Upon identifying equivalent set of applications 128 within the downloadable applications hosted by virtual store 214, mobile computing platform 122 may automatically download equivalent set of applications 128 from virtual store 214 and then automatically install equivalent set of applications 128 without requiring input from the user to initiate downloading and/or installing equivalent set of applications 128.

In another example, mobile computing platform 122 may automatically navigate to each application included in equivalent set of applications 128 within virtual store 214 in response to equivalent-application information 216. For example, mobile computing platform 122 may navigate to the "Picture App" within virtual store 214 and then wait for the user's approval before downloading and/or installing the "Picture App." In this example, upon downloading the "Picture App" from virtual store 214 in response to the user's approval, mobile computing platform 122 may navigate to "Game App" and then wait for the user's approval before downloading and/or installing the "Game App."

As explained above in connection with method 300 in FIG. 3, a technology user may decide to switch from one mobile computing platform to another or add a new mobile computing platform to his or her existing collection of platforms. For example, a user of an APPLE IOS-based smartphone may decide to switch from the APPLE IOS-based smartphone to a new GOOGLE ANDROID-based smartphone. In this example, prior to switching from the APPLE IOS-based smartphone to the GOOGLE ANDROID-based smartphone, the user may have created a customized application profile on the APPLE IOS-based smartphone. Rather than attempting to manually create a similarly customized application profile on the GOOGLE ANDROID-based smartphone, the user may use a synchronization application that facilitates an at least partially automated synchronization of the GOOGLE ANDROID-based smartphone and the APPLE IOS-based smartphone with respect to the user's customized application profile.

In one example, the user may download and install the synchronization application to the APPLE IOS-based smartphone (or to his or her laptop that interfaces with the APPLE IOS-based smartphone). The user may then direct the synchronization application to collect application information that identifies the user's customized application profile on the APPLE IOS-based smartphone. Once the synchronization application has collected the application information that identifies the user's customized application profile on the APPLE IOS-based smartphone, the synchronization application may upload the application information to a synchronization server.

Similarly, the user may download and install the synchronization application to the new GOOGLE ANDROID-based smartphone. The user may then direct the synchronization application to obtain equivalent-application information that identifies the user's customized application profile on the GOOGLE ANDROID-based smartphone. For example, the synchronization application may issue a request to obtain the equivalent application information that identifies the user's customized application profile on the GOOGLE ANDROID-based smartphone and then send the request to the synchronization server. In this example, the synchronization server may obtain the request from the synchronization application and then query an application-matching engine that maps applications across such APPLE IOS-based and GOOGLE ANDROID-based devices to generate the equivalent-application information.

Upon generating the equivalent-application information, the synchronization server may send the equivalent-application information to the synchronization application installed on the user's new GOOGLE ANDROID-based smartphone. The synchronization application may then use the equivalent-application information to synchronize the new GOOGLE ANDROID-based smartphone and the APPLE IOS-based smartphone with respect to the user's customized application profile.

Accordingly, by facilitating at least partially automated synchronization of the new GOOGLE ANDROID-based smartphone and the APPLE IOS-based smartphone with respect to the user's customized application profile, the synchronization application and synchronization server may eliminate the need to have the user manually create a similarly customized application profile on the GOOGLE ANDROID-based smartphone. In addition, by eliminating the need to have the user manually create a similarly customized application profile on the GOOGLE ANDROID-based smartphone, the synchronization application and synchronization server may help improve the user's experience with switching from the APPLE IOS-based smartphone to the new GOOGLE ANDROID-based smartphone.

Figure 7:
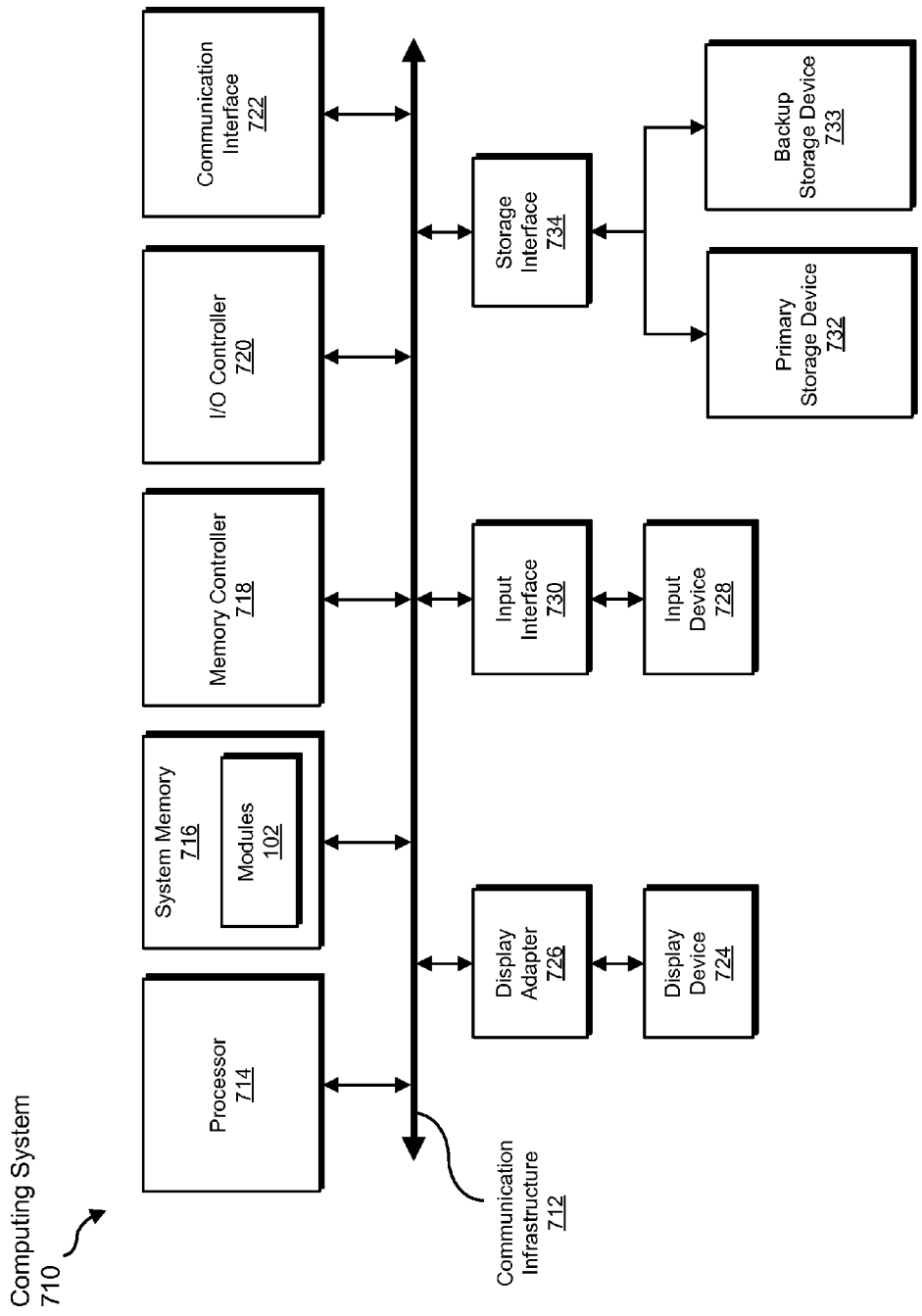
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the identifying, detecting, synchronizing, querying, directing, collecting, storing, providing, locating, uploading, obtaining, determining, entering, authenticating, searching, automatically downloading, automatically installing, and navigating steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
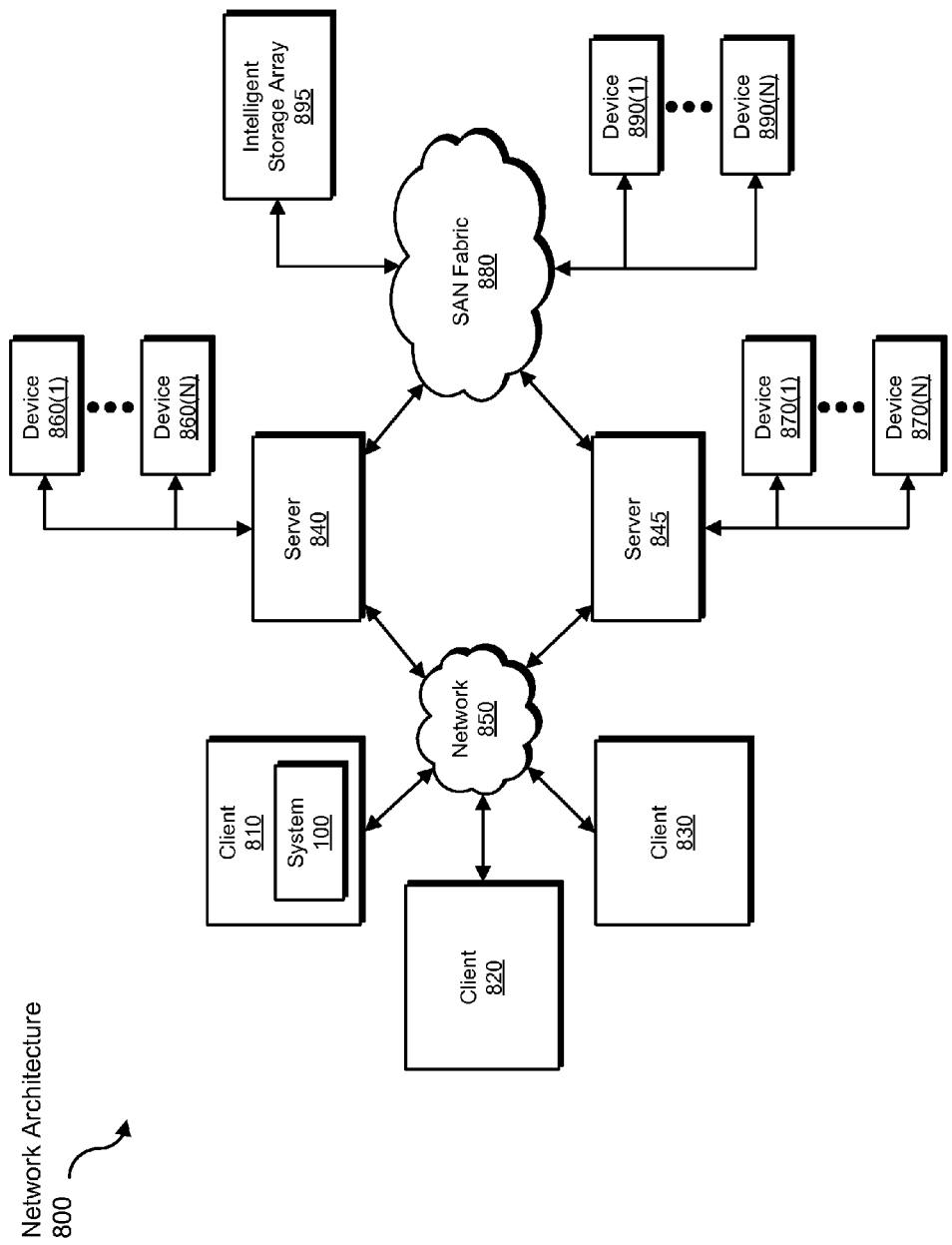
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the identifying, detecting, synchronizing, querying, directing, collecting, storing, providing, locating, uploading, obtaining, determining, entering, authenticating, searching, automatically downloading, automatically installing, and navigating steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for synchronizing mobile computing platforms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may obtain application information to be transformed, transform the application information into equivalent-application information, output a command to initiate downloading an equivalent set of applications based at least in part on the equivalent-application information, use the command to initiate downloading the equivalent set of applications, and synchronize different mobile computing platforms with respect to a particular set of applications based at least in part on the command. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for synchronizing mobile computing platforms, at least a portion of the method being performed by a computing device comprising at least one processor, the method comprising:
   identifying a set of applications installed on a mobile computing platform by:
   collecting application information that identifies the set of applications installed on the mobile computing platform;

storing the application information in a cloud-based synchronization account capable of being accessed by an additional mobile computing platform;
detecting a request from the additional mobile computing platform to synchronize the additional mobile computing platform and the mobile computing platform with respect to the set of applications by:
providing the additional mobile computing platform with a synchronization application that, when downloaded and executed by the additional mobile computing platform, directs the additional mobile computing platform to issue the request to synchronize the additional mobile computing platform and the mobile computing platform with respect to the set of applications, wherein synchronizing the additional mobile computing platform and the mobile computing platform with respect to the set of applications comprises downloading, to the additional mobile computing platform, an equivalent set of applications that corresponds to the set of applications installed on the mobile computing platform;
obtaining the request from the additional mobile computing platform via the synchronization application;
in response to detecting the request from the additional mobile computing platform, synchronizing the additional mobile computing platform and the mobile computing platform with respect to the set of applications by:
authenticating the additional mobile computing platform with the cloud-based synchronization account prior to satisfying the request;
querying an application-matching engine to determine the equivalent set of applications that corresponds to the set of applications installed on the mobile computing platform, wherein querying the application-matching engine comprises entering, into the application-matching engine, a set of application identifiers that uniquely identify the set of applications installed on the mobile computing platform;
upon querying the application-matching engine to determine the equivalent set of applications that corresponds to the set of applications on the additional mobile computing platform, directing the additional mobile computing platform to download the equivalent set of applications.

2. The method of claim 1, wherein collecting the application information that identifies the set of applications installed on the mobile computing platform comprises directing, by way of the synchronization application, the mobile computing platform to:
locate the application information on the mobile computing platform;
upload the application information to the cloud-based synchronization account.

3. The method of claim 1, wherein collecting the application information that identifies the set of applications installed on the mobile computing platform comprises providing the mobile computing platform with a synchronization library that, when called by an application running on the mobile computing platform, directs the application to:
locate the application information on the mobile computing platform;
upload the application information to the cloud-based synchronization account.

4. The method of claim 1, wherein collecting the application information that identifies the set of applications installed on the mobile computing platform comprises:
identifying a client device that interfaces with the mobile computing platform;
identifying a client-based application installed on the client device that facilitates access to the application information that identifies the set of applications installed on the mobile computing platform;
directing, by way of the synchronization application, the client device to:
collect the application information that identifies the set of applications installed on the mobile computing platform via the client-based application;
upload the application information to the cloud-based synchronization account.

5. The method of claim 1, wherein detecting the request to synchronize the additional mobile computing platform and the mobile computing platform with respect to the set of applications comprises:
obtaining the request to synchronize the additional mobile computing platform and the mobile computing platform from the additional mobile computing platform;
locating a platform identifier that identifies the additional mobile computing platform in the request obtained from the additional mobile computing platform.

6. The method of claim 5, wherein querying the application-matching engine to determine the equivalent set of applications comprises:
querying the application-matching engine based at least in part on the application information that identifies the set of applications installed on the mobile computing platform and the platform identifier that identifies the additional mobile computing platform;
determining the equivalent set of applications based at least in part on querying the application-matching engine.

7. The method of claim 6, wherein querying the application-matching engine based at least in part on the application information and the platform identifier comprises:
entering the application information and the platform identifier into the application-matching engine;
in response to entering the application information and the platform identifier into the application-matching engine:
obtaining equivalent-application information that identifies the equivalent set of applications from the application-matching engine;
storing the equivalent-application information in the cloud-based synchronization account.

8. The method of claim 1, wherein authenticating the additional mobile computing platform with the cloud-based synchronization account comprises:
obtaining user credentials from the additional mobile computing platform via the synchronization application;
searching an authentication database associated with the cloud-based synchronization account for the user credentials obtained from the additional mobile computing platform;
identifying the user credentials obtained from the additional mobile computing platform while searching the authentication database associated with the cloud-based synchronization account.

9. The method of claim 1, wherein detecting the request to synchronize the additional mobile computing platform and the mobile computing platform with respect to the set of applications comprises:
providing the mobile computing platform with a synchronization library that, when called by an application running on the additional mobile computing platform, directs the additional mobile computing platform to issue the request;

obtaining the request from the additional mobile computing platform via the application running on the additional mobile computing platform.

10. The method of claim 1, wherein directing the additional mobile computing platform to download the equivalent set of applications comprises directing the additional mobile computing platform to install the equivalent set of applications.

11. The method of claim 1, wherein directing the additional mobile computing platform to download the equivalent set of applications comprises:
   identifying a virtual store that hosts downloadable applications corresponding to the additional mobile computing platform;
   identifying the equivalent set of applications within the downloadable applications hosted by the virtual store;
   upon identifying the equivalent set of applications within the downloadable applications hosted by the virtual store, directing the additional mobile computing platform to download the equivalent set of applications from the virtual store.

12. The method of claim 11, wherein directing the additional mobile computing platform to download the equivalent set of applications from the virtual store comprises directing the additional mobile computing platform to:
   automatically download the equivalent set of applications from the virtual store without requiring user input to initiate a download of each application in the equivalent set of applications;
   automatically install the equivalent set of applications without requiring user input to initiate an install of each application in the equivalent set of applications.

13. The method of claim 1, wherein:
   the mobile computing platform comprises an operating system running on a mobile hardware architecture;
   the additional mobile computing platform comprises a different operating system running on a different mobile hardware architecture.

14. A system for synchronizing mobile computing platforms, the system comprising:
   an identification module, stored in memory, that identifies a set of applications installed on a mobile computing platform by:
     collecting application information that identifies the set of applications installed on the mobile computing platform;
     storing the application information in a cloud-based synchronization account capable of being accessed by an additional mobile computing platform;
   a detection module, stored in memory, that detects a request from the additional mobile computing platform to synchronize the additional mobile computing platform and the mobile computing platform with respect to the set of applications by:
     providing the additional mobile computing platform with a synchronization application that, when downloaded and executed by the additional mobile computing platform, directs the additional mobile computing platform to issue the request to synchronize the additional mobile computing platform and the mobile computing platform with respect to the set of applications, wherein synchronizing the additional mobile computing platform and the mobile computing platform with respect to the set of applications comprises downloading, to the additional mobile computing platform, an equivalent set of applications that corresponds to the set of applications installed on the mobile computing platform;
     obtaining the request from the additional mobile computing platform via the synchronization application;
   a synchronization module, stored in memory, that synchronizes the additional mobile computing platform and the mobile computing platform with respect to the set of applications in response to the request by:
     authenticating the additional mobile computing platform with the cloud-based synchronization account prior to satisfying the request;
     querying an application-matching engine to determine the equivalent set of applications that corresponds to the set of applications installed on the mobile computing platform, wherein querying the application-matching engine comprises entering, into the application-matching engine, a set of application identifiers that uniquely identify the set of applications installed on the mobile computing platform;
     upon querying the application-matching engine to determine the equivalent set of applications that corresponds to the set of applications on the additional mobile computing platform, directing the additional mobile computing platform to download the equivalent set of applications;
   at least one physical processor configured to execute the identification module, the detection module, and the synchronization module.

15. A non-transitory computer-readable-storage medium comprising one or more computer-executable instructions that, when executed by at least one processor of a computing device, cause the computing device to:
   identify a set of applications installed on a mobile computing platform by:
     collecting application information that identifies the set of applications installed on the mobile computing platform;
     storing the application information in a cloud-based synchronization account capable of being accessed by an additional mobile computing platform;
   detect a request from the additional mobile computing platform to synchronize the additional mobile computing platform and the mobile computing platform with respect to the set of applications by:
     providing the additional mobile computing platform with a synchronization application that, when downloaded and executed by the additional mobile computing platform, directs the additional mobile computing platform to issue the request to synchronize the additional mobile computing platform and the mobile computing platform with respect to the set of applications, wherein synchronizing the additional mobile computing platform and the mobile computing platform with respect to the set of applications comprises downloading, to the additional mobile computing platform, an equivalent set of applications that corresponds to the set of applications installed on the mobile computing platform;
     obtaining the request from the additional mobile computing platform via the synchronization application;
   synchronize the additional mobile computing platform and the mobile computing platform with respect to the set of applications in response to the request by:
     authenticating the additional mobile computing platform with the cloud-based synchronization account prior to satisfying the request;

querying an application-matching engine to determine the equivalent set of applications that corresponds to the set of applications installed on the mobile computing platform, wherein querying the application-matching engine comprises entering, into the application-matching engine, a set of application identifiers that uniquely identify the set of applications installed on the mobile computing platform;

upon querying the application-matching engine to determine the equivalent set of applications that corresponds to the set of applications on the additional mobile computing platform, directing the additional mobile computing platform to download the equivalent set of applications.

16. The method of claim 1, wherein providing the additional mobile computing platform with the synchronization application comprises enabling the additional mobile computing platform to download the synchronization application from a synchronization server that facilitates at least partially automated synchronization of mobile computing platforms.

17. The method of claim 1, wherein querying the application-matching engine to determine the equivalent set of applications comprises determining the equivalent set of applications by matching the set of application identifiers that uniquely identify the set of applications installed on the mobile computing platform to another set of application identifiers that uniquely identify the equivalent set of applications.

18. The method of claim 1, wherein a name of at least one application in the set of applications differs from a name of a corresponding application in the equivalent set of applications.

19. The method of claim 1, further comprising:
automatically identifying, via a bot, a relationship between at least one application in the set of applications installed on the mobile computing platform and at least one corresponding application in the equivalent set of applications;
populating, via the bot, a database accessible to the application-matching engine to account for the relationship between the application in the set of applications installed on the mobile computing platform and the corresponding application in the equivalent set of applications.

20. The method of claim 11, wherein directing the additional mobile computing platform to download the equivalent set of applications from the virtual store comprises directing the additional mobile computing platform to:
navigate to at least one application in the equivalent set of applications within the virtual store;
obtain user approval before downloading and installing the application to the additional mobile computing platform.

* * * * *